United States Patent [19]

View et al.

[11] Patent Number: 5,129,259

[45] Date of Patent: Jul. 14, 1992

[54] AUTOMATIC TRANSMISSION ANALYZING AND FAULT INDICATING SYSTEM

[76] Inventors: Donald J. View; Jay M. View, both of 5510 Dorothy Dr., San Diego, Calif. 92115

[21] Appl. No.: 615,023

[22] Filed: Nov. 16, 1990

Related U.S. Application Data

[63] Continuation-in-part of Ser. No. 412,497, Sep. 26, 1989, abandoned.

[51] Int. Cl.⁵ .............................................. G01M 19/00
[52] U.S. Cl. .................................... 73/118.1; 340/453; 340/455
[58] Field of Search ............... 73/118.1; 340/453, 455, 340/461, 462; 248/363

[56] References Cited

U.S. PATENT DOCUMENTS 4,562,729  1/1986  Maloney .............................. 73/118.1

FOREIGN PATENT DOCUMENTS 2019585  10/1979  United Kingdom ............... 73/118.1

Primary Examiner—Jerry W. Myracle

[57] ABSTRACT

An analyzing and fault indicating system for automatic transmissions and their related electro-mechanical operating functions, including vacuum pressure and/or fluid pressure and/or governor and/or computer controlled electrical circuits on automotive vehicles so equipped. This system inserts a passive electron flow measuring ampere meter in series with, and continuously monitors the transmission's principal solenoid winding, called a torque converter clutch (T.C.C.) solenoid, for manufacturers specified quantity of electron flow for satisfactory solenoid operation. Contained in an apparatus case are the system's lamps, light emitting diodes and an ammeter which functions to indicate faults or satisfactory operation of the automatic transmission and/or related function controls. The apparatus case is mechanically suspended from the in-vehicle rear view mirror or its immediate vicinity and connected by two cables to the automatic transmission.

5 Claims, 11 Drawing Sheets

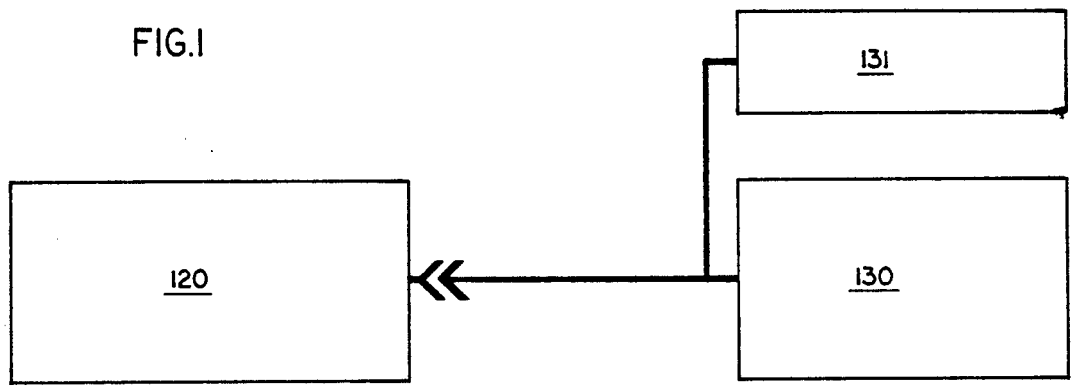
FIG.1
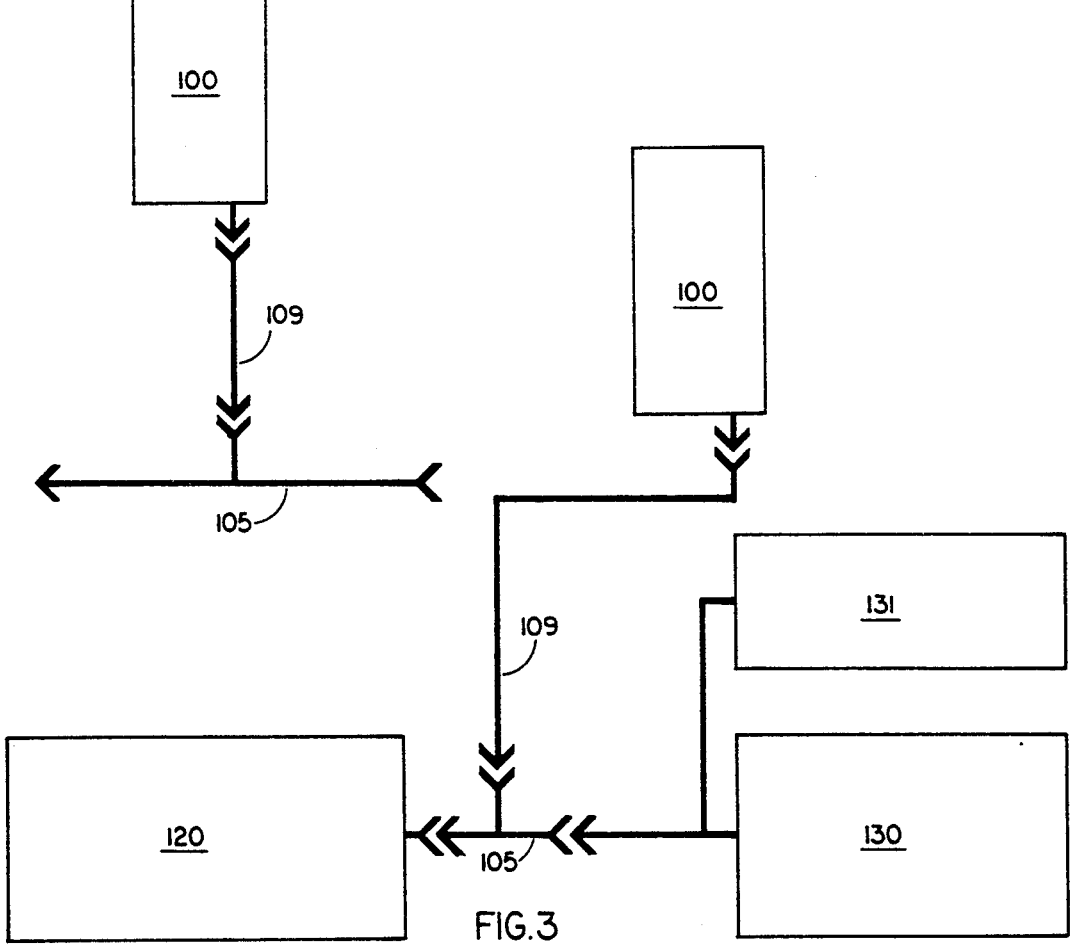
FIG.2
FIG.3

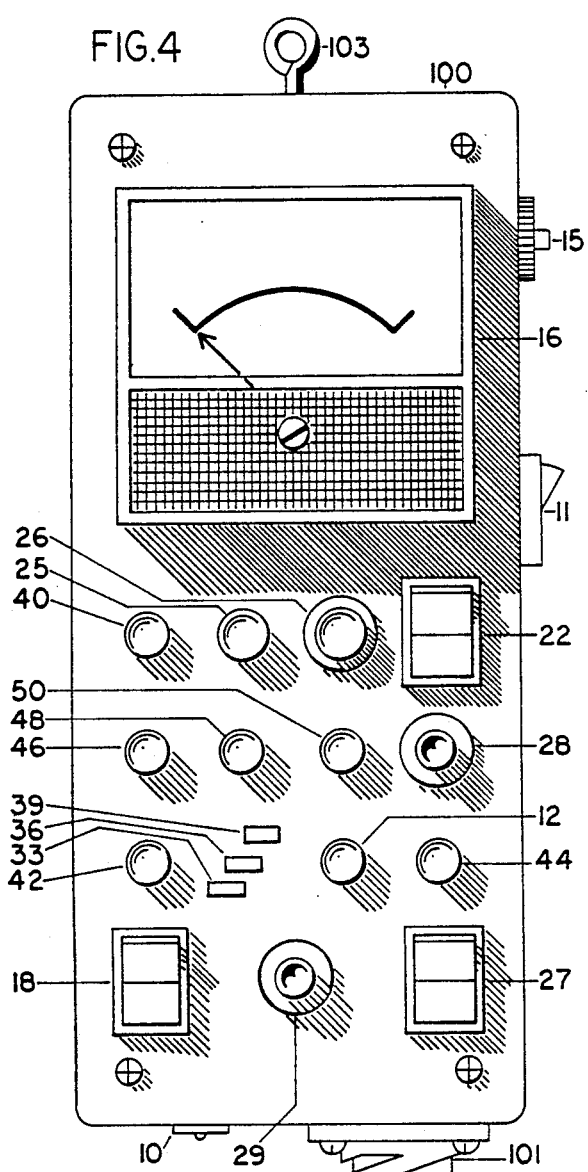
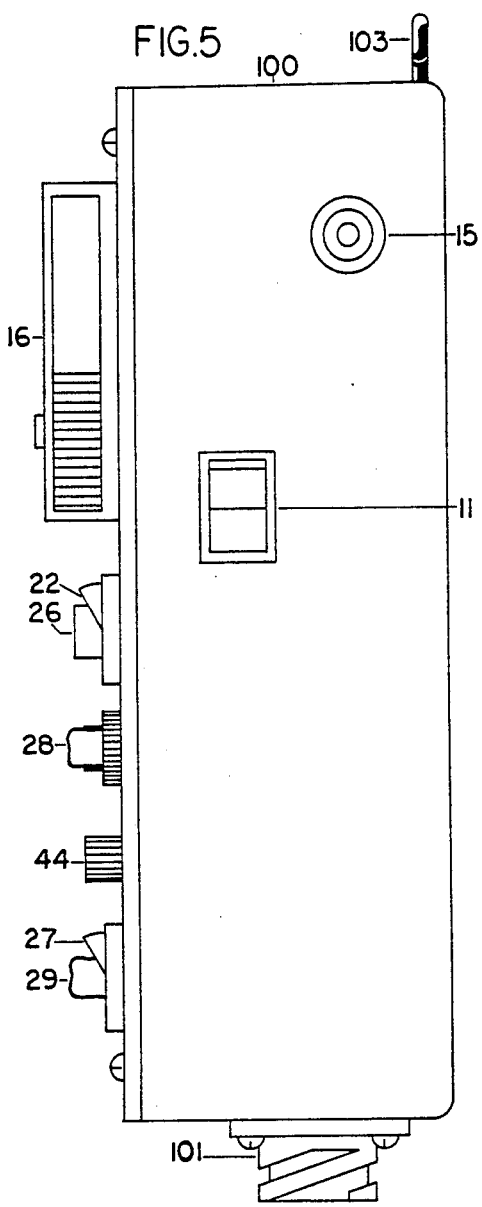
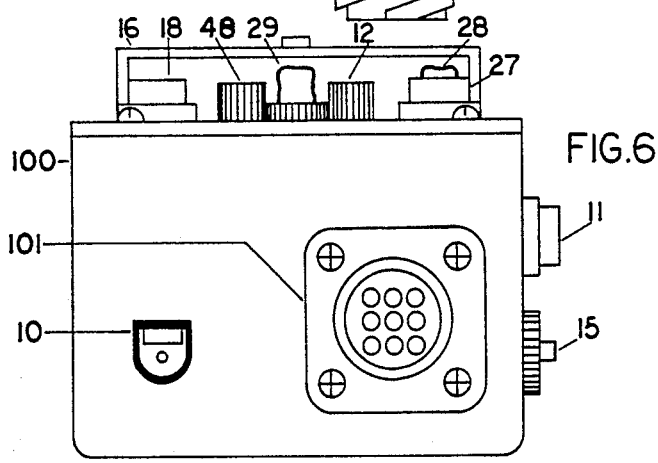

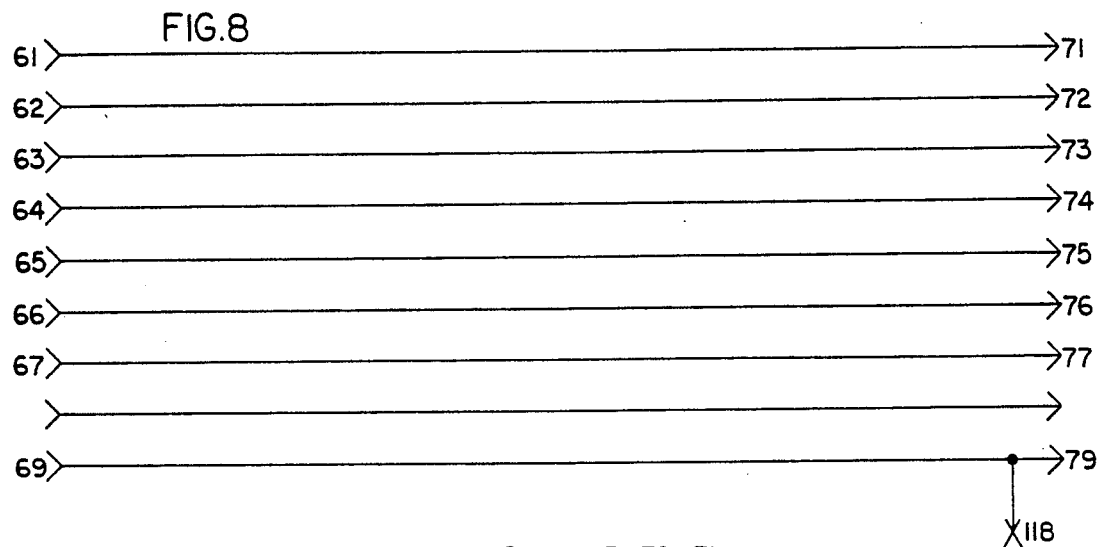
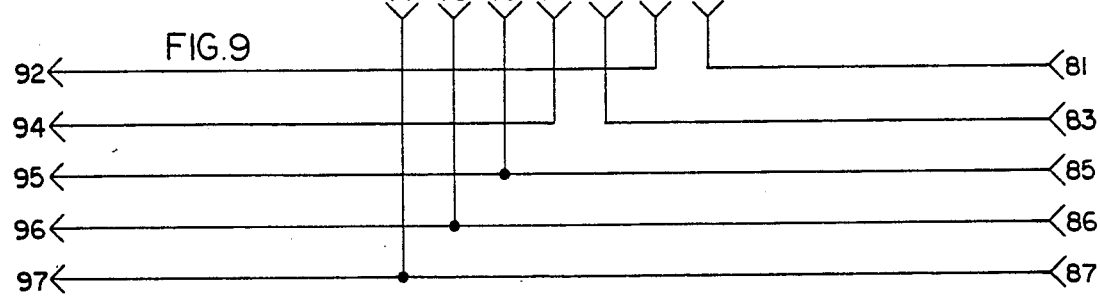
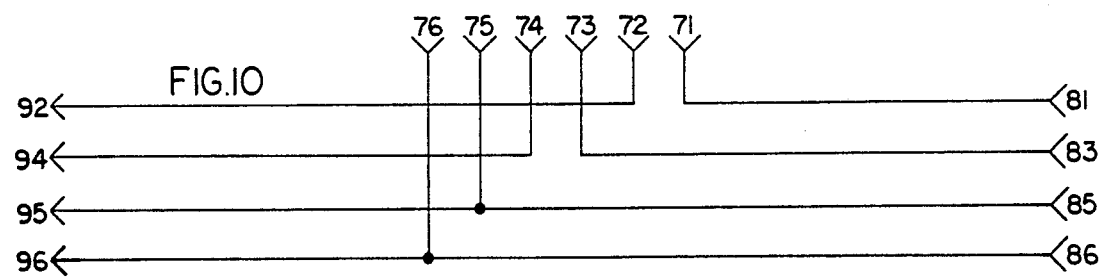
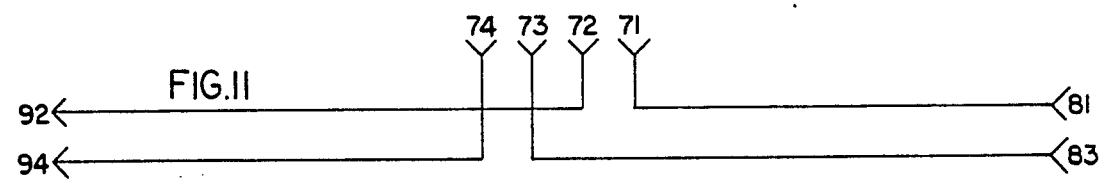

AUTOMATIC TRANSMISSION ANALYZING AND FAULT INDICATING SYSTEM

This is a continuation-in-part of copending application Ser. No. 412,497 filed on Sep. 26, 1989, now abandoned.

BACKGROUND OF INVENTION

1. Field of Invention

This invention relates to automobile automatic transmission and more specifically to test equipment designed to be used in conjunction with the automatic transmission and a plurality of electronic sensors or solenoids and their functions in order to perform a more comprehensive operations diagnostic check on many automatic transmission control systems with adaptability from vehicle to vehicle systems made possible via change of wire harnesses specific to respective different vehicle systems.

2. Review of Prior Art

Prior state of the art test equipment fails to monitor and measure the quantity of electron flow carried by conductors connected to automatic transmission solenoids that control input to output power ratios from the engine to the driven wheels. The large majority of modern automobiles are built with automatic transmissions usually equipped with electronic sensors and solenoids in a manner to increase automatic transmission output operation efficiency for improved miles per gallon of fuel used providing maximum engine power transfer to the drive wheels controlled through the automatic transmission. Vehicle owner demands coupled with United States of America legislative guidelines for improving vehicle use fuel efficiency is causing more complicated automatic transmissions as part of the vehicle. Many automotive vehicle manufacturers producing vehicles with automatic transmissions also produce test equipment specific for their respective vehicle models. With the ever increasing numbers of vehicle models each year and model changes year after year there is a very substantial expense purchasing the numerous special test tools required for competent service. Another problem of significant mangnitude becomes apparent even for the highly skilled automatic transmission technician of having to change from one test unit to another of many units for specific models, that is a stressful test of memory and refamiliarization in order to properly test and analyze specific automatic transmission electronic sensors and solenoid operations within the operating limits specified by the vehicle manufacturer. In continuing importance a single tester usable between different vehicles with their respective automatic transmissions and other vehicles with their respective automatic transmissions via change of wire harness specific to each different vehicle with its respective automatic transmission provides accurate test results and analysis. Some prior state of the art testers use vehicle computer interface information about the automatic transmission gear shift sensor and solenoid performance information for diagnostics which has proven to be false, incomplete or no information, due to computer malfunction or interdependence on other engine functions not related to automatic transmission functions, while the most simple tester can only be used when the vehicle is stationary with engine off resulting in incomplete tests. Many prior state of the art testers are usually over one square foot of top surface area by four inches in depth whose physical size necessitates using a technician and a vehicle driver for safe road tests.

The primary object of this invention is to provide an automotive automatic transmission gear shift position sensor and or solenoid operation analyzing and fault indicating system tester configured for connecting into the existing automotive electrical systems between an automobile automatic transmission and the associated automotive electrical control systems so as to monitor the electrical signals provided to or from the transmission thus restricting necessity for numerous auxiliary special test units specific for respective vehicle models with automatic transmissions.

A further objective is to provide an electrical signal simulator means configured for connecting into the existing electrical signal conductors to provide to the automatic transmission or the automotive electrical system known signals in lieu of such signals that are normally present on the conductors.

Another object of this invention is to provide more efficient, less expensive testing and analyzing services for a large variety of automotive automatic transmissions.

Another object of this invention is to provide a hand hold size test control box weighing less than three pounds less than seven inches high, four inches wide and three inches deep with safe quick detachable mount to the inside vehicle rear view mirror or windshield for road tests.

Another object of this invention is the use of high visibility performance indicators with easy operational test activating switches.

Additional objects and advantageous features of this invention will be readily obvious from the following detailed descriptions when used in conjunction with the accompanying drawings illustrating an automatic transmission operations analyzer and fault indicating system consisting of a relatively small versatile test control box cable conductors connectable to automatic transmissions of many year and model vehicles not just specific year and model vehicles via change of wire harness interconnecting cable conductors specific to each different vehicle automatic transmission electrical control system without changing the test control box.

BRIEF DESCRIPTION OF THE DRAWINGS

FIG. 1 shows a block diagram of a vehicle electrical control system to its transmissions electrical components via wiring harness.

FIG. 2 shows a block diagram of this invention control box 100, cable conductors 109, specific year and model wire harness interconnect cable conductors 105.

FIG. 3 shows a block diagram of this invention control box 100, cable conductors 109, specific year and model wire harness interconnect cable conductors 105 to that specific year and model vehicle automatic transmission electrical control system.

FIG. 4 shows front view of control box 100 with numbered components location shown in actual physical size.

FIG. 5 shows right side view of control box with numbered components location in true physical size.

FIG. 6 shows bottom view of control box with numbered components location in true physical size.

FIG. 8 illustrates main common use cable conductors numbered at each end with one number 109 assigned for descriptive use.

FIG. 9 illustrates one of several specific year and model vehicle electrical control system to automatic transmission wire harness cable conductors interconnections for signal monitoring and test box switch initiated simulations.

FIG. 10 is the same as FIG. 9 minus one cable conductor.

FIG. 11 is the same as FIG. 9 minus three cable conductors.

DETAILED DESCRIPTION OF DRAWINGS

To provide maximum understanding of each figure embodiment with a minimum number of written words, I would like to specify for these drawing descriptions that an electron flow path is complete through a numbered component or a numbered cable conductor connector terminal pin --> that is engaged --->#>--- to its mating connector terminal sleeve>--- conductor connected to the next numbered component or components for example i.e. transfer switch 18/20 component 40 and transfer switch 22 or switch 18/21 to components 42 and 53.

Figure 22:
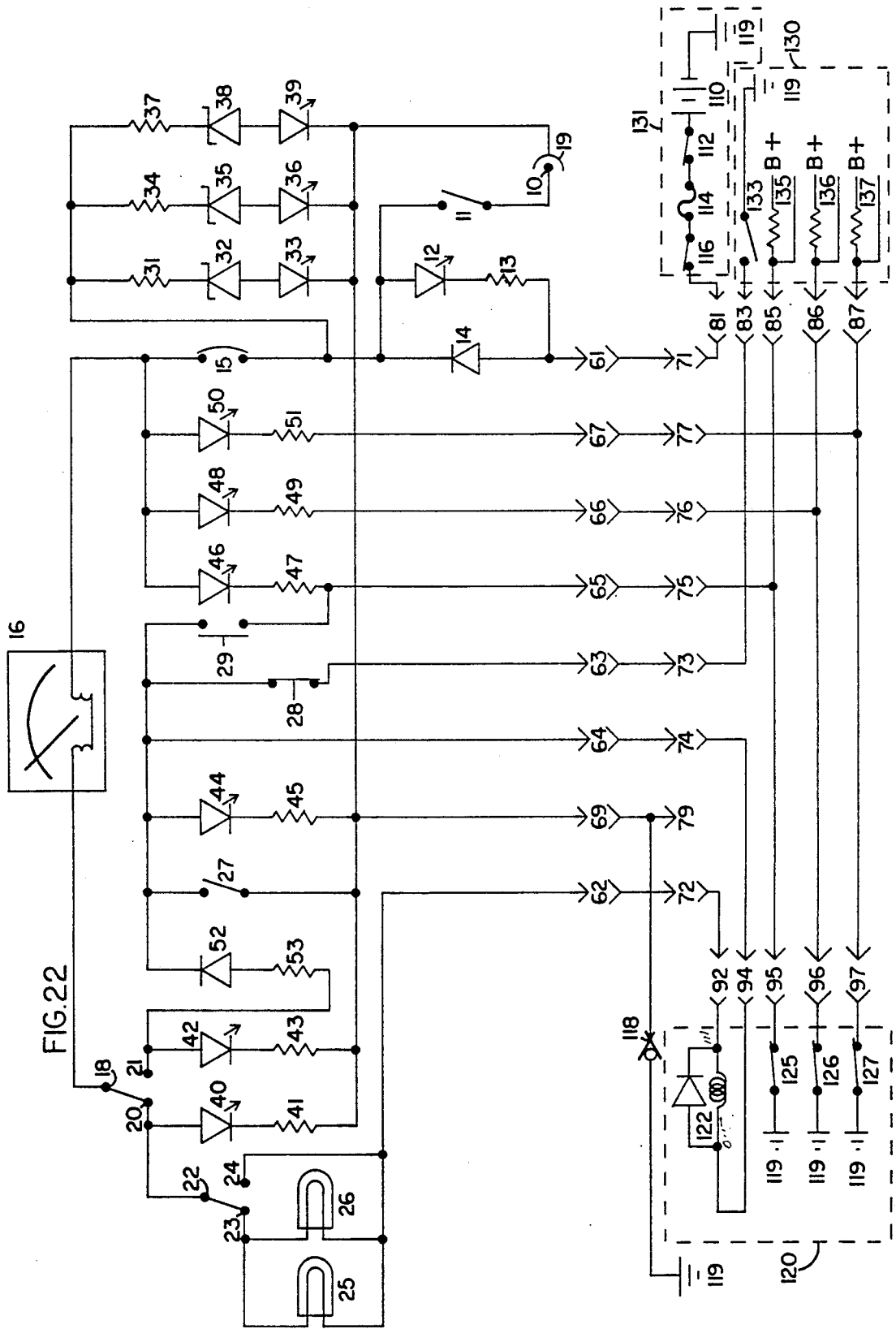
FIG. 22 incorporates FIG. 7 and FIGS. 8, 9, 12, 18 and 21 as required for a complete typical invention use illustration to describe electron circuits being analyzed and the possible faults indicated by the meter and/or light emitting diodes.

Shown in block diagram, FIG. 3 is an automatic transmission 120 connected to cable conductors 105 connected to cable conductors 109 and vehicle electrical control systems 130 and 131 with cable conductors 109 connected to analyzing and fault indicating system control box 100; also, schematic diagram FIG. 22 combines several figures for typical invention use testing most recent state of the art automatic transmission, but not limited thereto.

DESCRIPTION OF PREFERRED EMBODIMENT

Figure 7:
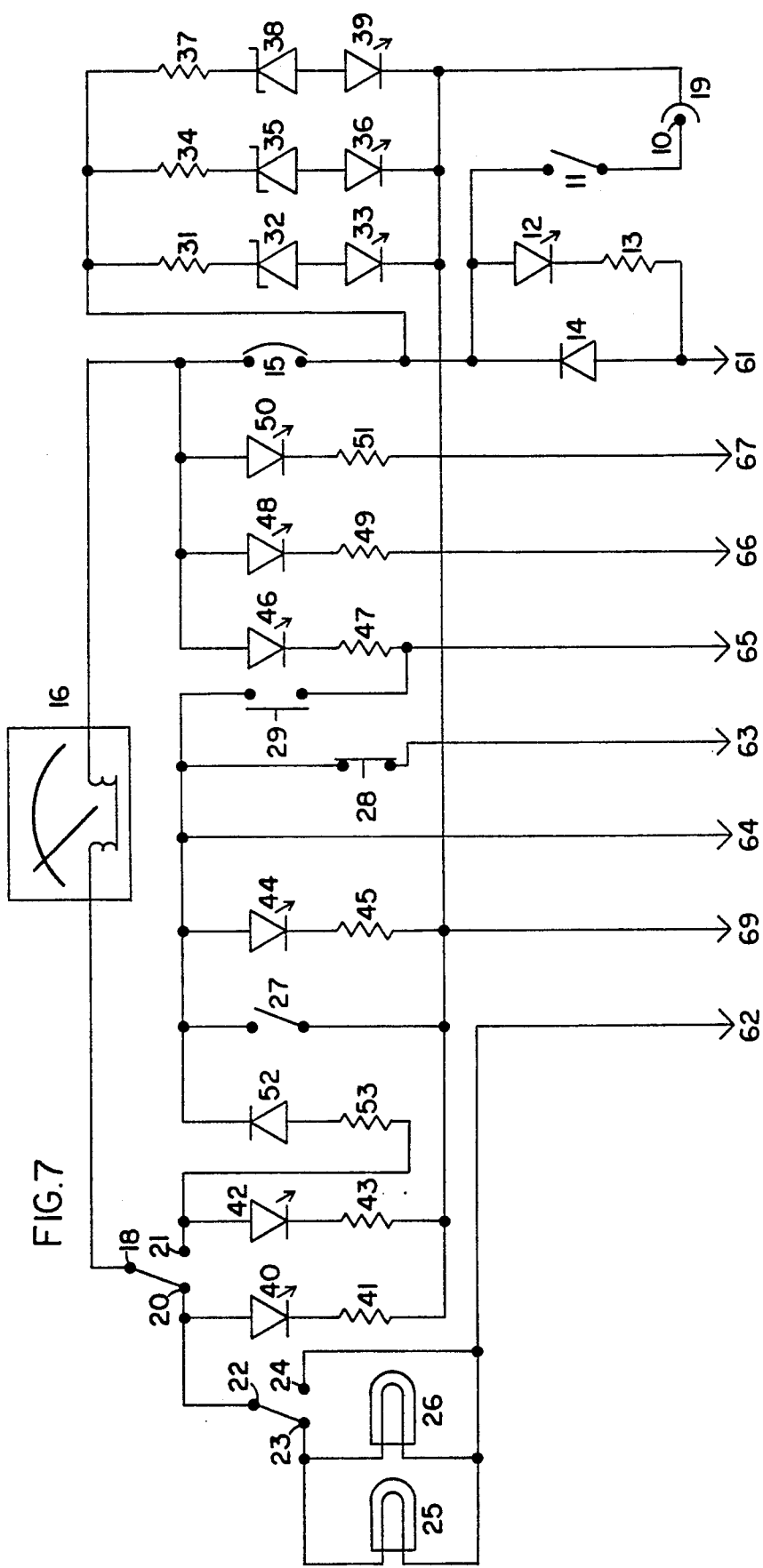
FIG. 7 incorporates all the elements of the analyzer and fault indicator system with FIGS. 8 and 9 or 10 or 11 connecting cables for connection to a vehicle's automatic transmission via the transmission's through-case socket and external wiring harness plug.
Figure 12:
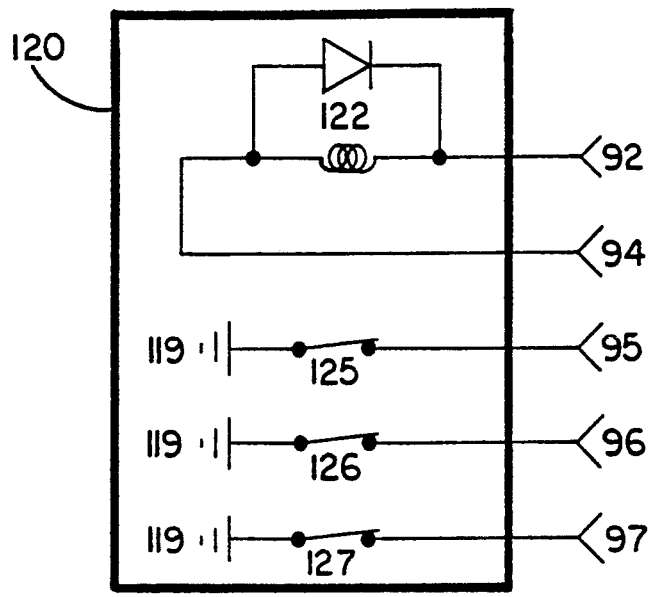
FIGS. 12 through 17 shows vehicle automatic transmissions which utilize various methods to energize the transmission torque converter clutch (T.C.C.) solenoid winding. To illustrate maximum use of this invention, the automatic transmission using a most recent state-of-the art technology is shown in FIG. 22 but this invention is not limited to it.
Figure 13:
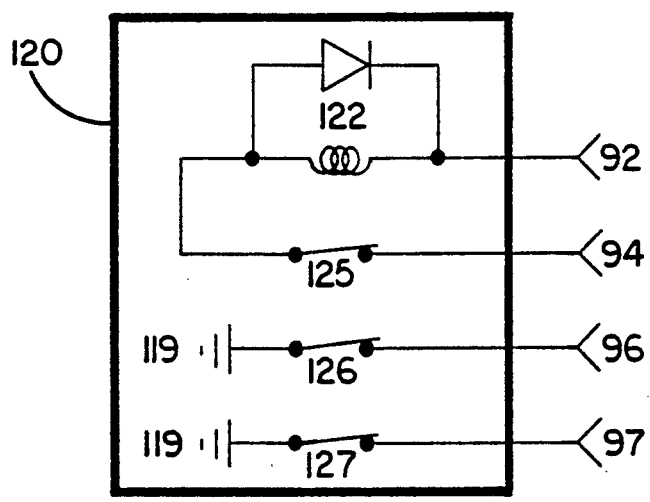
Figure 14:
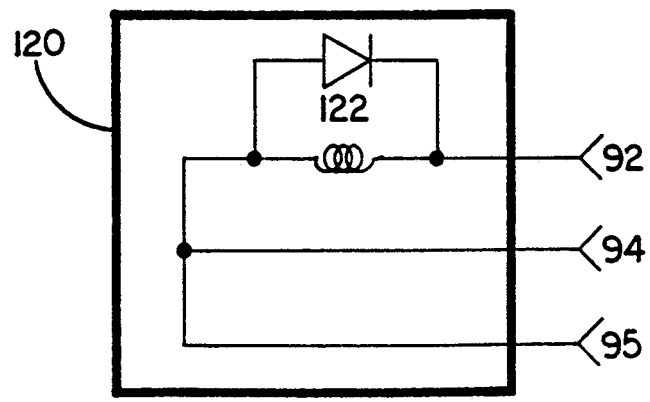
Figure 15:
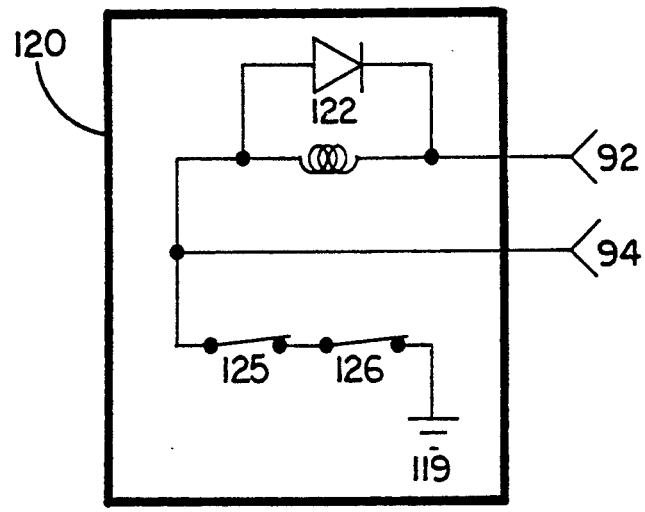
Figure 16:
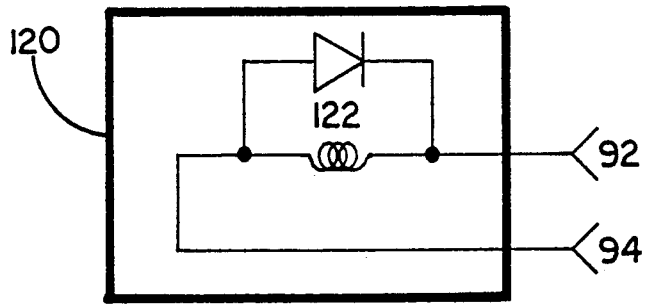
Figure 17:
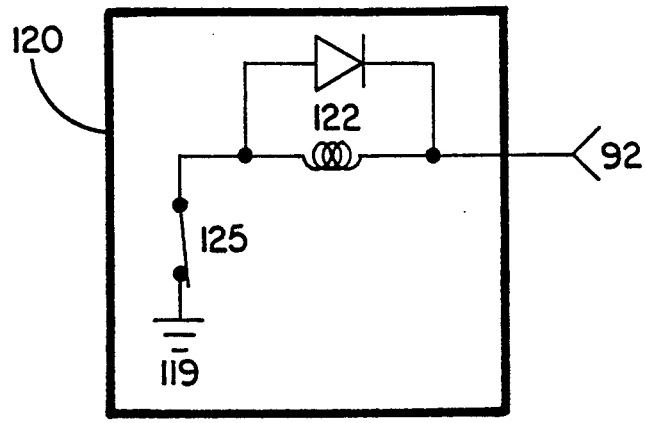

The analyzing and fault indicating system will now be described by referring to the drawings. FIGS. 1–3 are simplified schematic block diagrams of the invention and its interrelation to a vehicle transmission 120. The control box 100 is shown in its true physical size in FIGS. 4–6. The electrical components of control box 100 and its circuitry are shown in FIG. 7.

Figure 18:
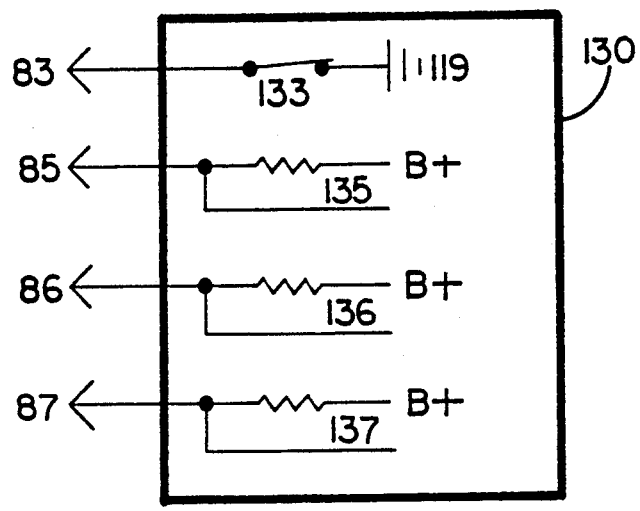
FIG. 18, 19, and 20 show various vehicle electronic control modules (ECM) used for transmision torque converter solenoid widing electron flow control.
Figure 19:
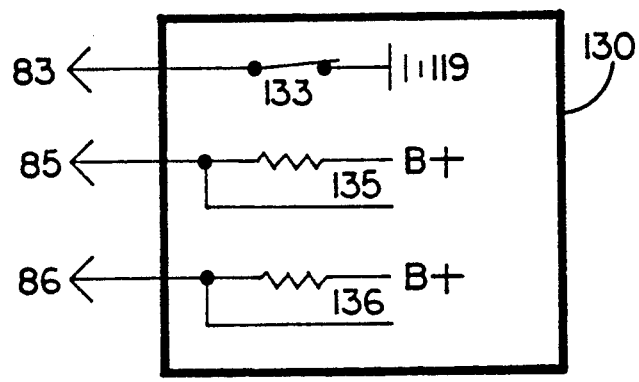
Figure 20:
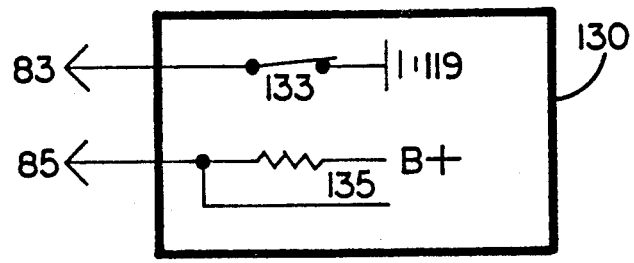

FIG. 8 illustrates schematically the main cable 109. FIGS. 9, 10 and 11 are Y-connectors used to interconnect to specific transmissions. FIGS. 12–17 show various types of transmissions. FIGS. 18–20 show various vehicle electronic control modules used for transmission torque convertor solenoid winding electron flow control.

Figure 21:
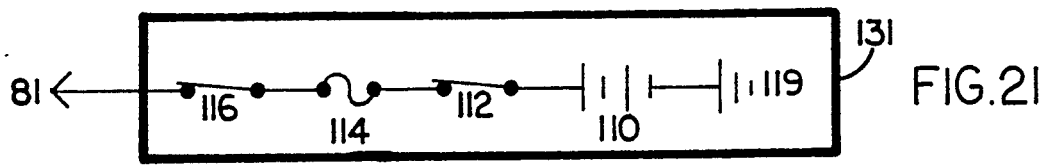
FIG. 21 shows a typical vehicle battery, ignition switch, gage fuse and brake switch that normally controls the positive (+) potential to the transmission torque converter clutch solenoid winding.

FIG. 21 shows a typical vehicle battery 110, ignition switch 112, gauge fuse 114 and brake switch 116 that normally controls the positive potential to the transmission torque convertor clutch solenoid winding.

FIG. 22 is a schematic electrical diagram of the complete analyzing and fault indicating system that was described in the original patent application.

Figure 23:
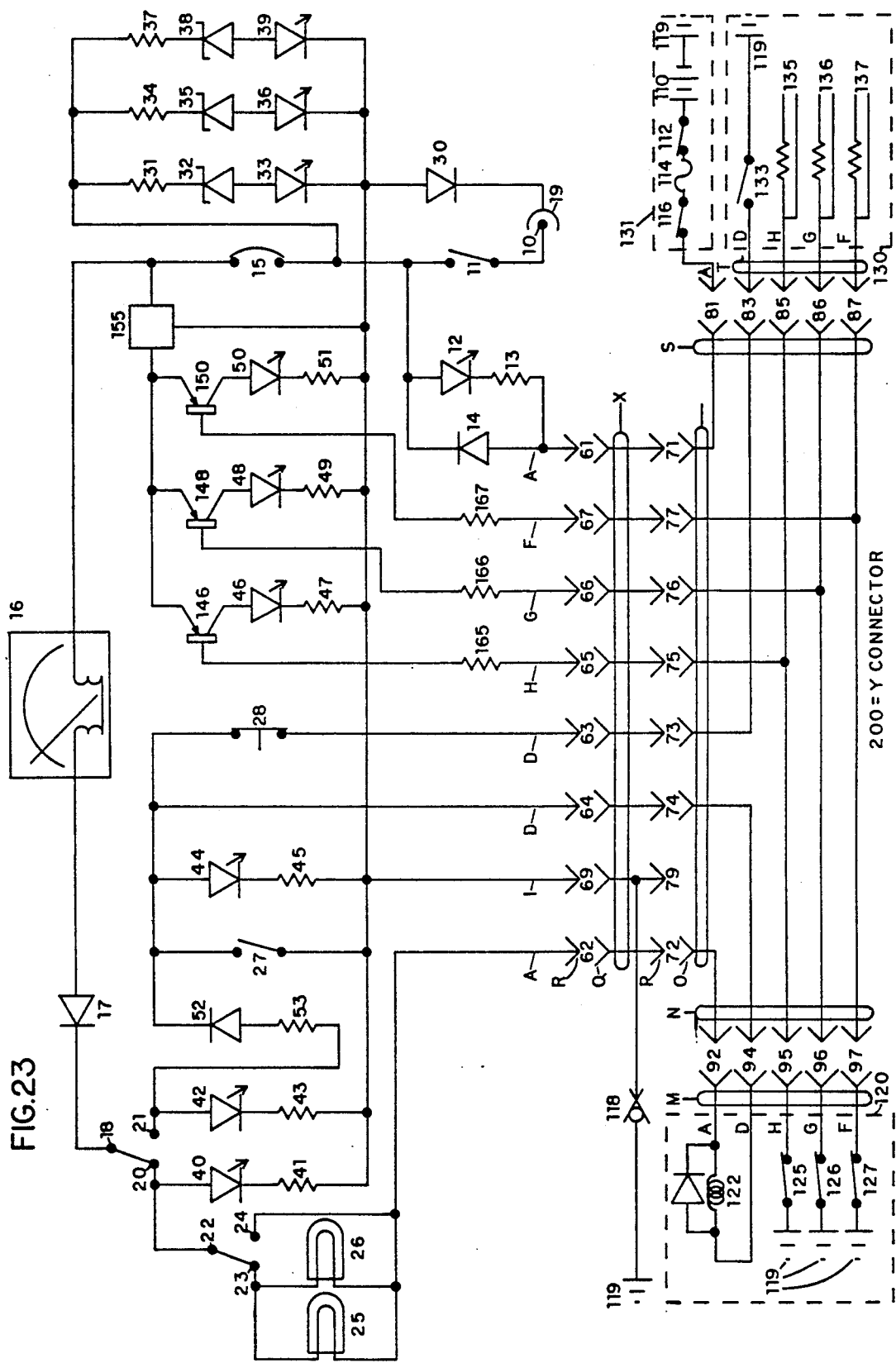
FIG. 23 illustrates this automotive automatic transmission analyzing and fault indicating system complete with interconnection to the vehicle electrical control systems.
Figure 24:
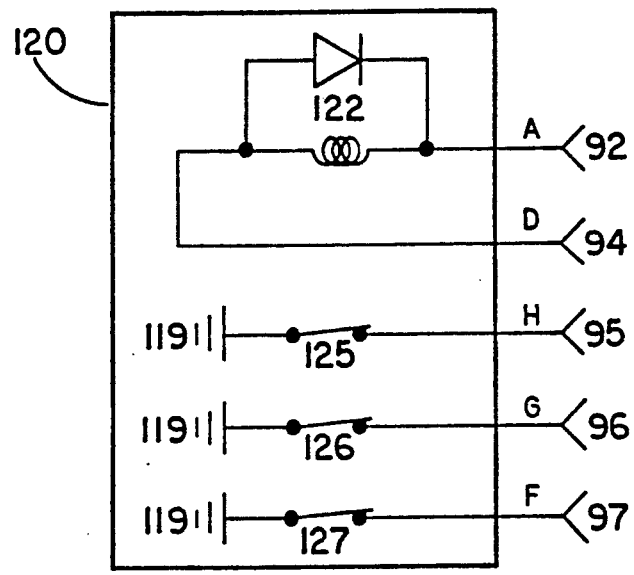
FIG. 24 illustrates typical automatic transmission contained torque converter clutch solenoid winding, second gear clutch position sensor switch, third gear clutch position sensor switch, fourth gear clutch gear position sensor switch numbered 122, 125, 126, 127 respectively and their lead terminating connector lettered A, D, H, G, F, solenoid numbers 92, 94 and sensors numbers 95, 96, 97 respectively.
Figure 25:
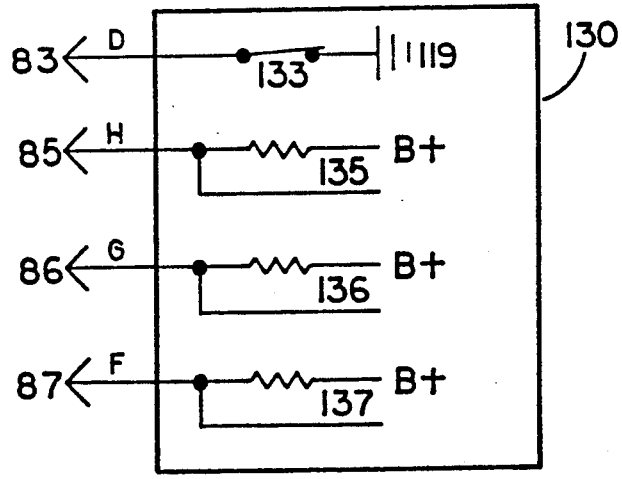
FIG. 25 illustrates a vehicle automatic transmission electrical control system contained torque converter clutch solenoid winding controller second gear clutch position sensor switch reader third gear clutch position sensor switch reader fourth gear clutch position sensor switch reader.
Figure 26:
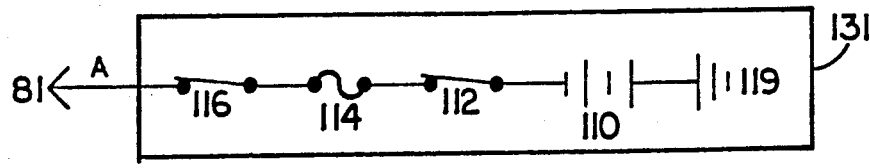
FIG. 26 illustrates typical vehicle electrical power source twelve and one half volt battery interconnection to the vehicle electrical control system via chassis, ignition switch, gauge fuse, foot brake switch, conductor terminal as numbered components 110, 119, 112, 114, 116, 81.

Using schematic diagram FIG. 23 that includes component axial leads or other electrical path means each electron flow path is verbally traced with analyzing, fault indicating or test simulation stated following verbal trace.

In FIG. 23 the entire automatic transmission analyzing and fault indicating system for a vehicle is illustrated in combination with transmission 120, electrical control module 130, and driver unit 131. Driver unit 131 has battery 110, and ignition switch 112, a fuse 114 and a brake switch 116. Electronic control module 130 receives information relating to coolant temperature, atomospheric pressure, vehicle speed and other relevant information for the transmission. Electronic control module 130 has an external socket T connected internally to respective lead lines, A, B, C, D and E. A transmission Y-connecter 200 has sockets S, N, and O at its respective ends. Socket S is detachably connected to socket T.

Transmission 120 has a torque converter clutch solenoid 122, a second clutch switch 125, a third clutch switch 126, and a fourth clutch switch 127. Socket M is on the outer casing of the transmission and socket N of transmission Y-connector 200 is detachably connected thereto.

An elongated cable X has an eight lead socket P at its one end and eight lead socket Q at its other end. Lead lines A (input), F, G, H, D (input), D (output), I, and A (output) each extend the length of connection cable X. The transmission analyzer unit 100 has a socket R on its outer surface that is internally connected to lead lines A (input), F, G, H, D (input), D (output), I, and A (output). Socket R is detachably connected to socket Q of connection cable X. Lead electrical connector A is part of the circuit that passes through ammeter 16 and which monitors the electron flow therethrough to the transmission torque converter clutch solenoid 122. Lamps 25 and 26 identify shorts in leads A and D. The circuit loops on lead A that pass through LED's 33, 36 and 39 respectively indicate a battery voltage of 10.1, 11.9, or 15.2. Lead A can also be connected to an external power source through connections 10 and 19. Also leads A/D provide for a loop test which disconnects the transmission from the tester which allows functions to be performed by a computer test under a simulated load.

Electron flow illuminates LED 50 controlled by fourth gear clutch position sensor switch 127 for analyzing fourth gear operation. Electron flow illuminates LED 48 controlled by third gear clutch position sensor switch 126 for analyzing third gear operation. Electron flow illuminates LED 46 controlled by second gear clutch position switch 125 for analyzing second gear clutch operation.

Electron flow illuminates LED 40 for verification test control box diode 14, circuit breaker 15, ammeter 16, diode 17, test switch 18/20 show circuit continuity for continuing tests. SPDT switch 22/23, permits illumination of lamps 25 and 26 to indicate a fault on conductor 92 or solenoid winding 122 in the automatic transmission. SPDT switch 22/24 removes lamps 25 and 26 from test circuits and connects automatic transmission electrical control solenoid winding in 122 and winding out 122 conductor.

SPDT switch 18/21 permits electron flow to illuminate LEAD 42 as visual verification switch 18/21 is providing circuit continuity for simulated solenoid winding and its computer circuit.

Electron flow illuminates LED 42 and verifies electron flow path through to resistor 53, diode 52, LED 44, switch 28 tests specific portion of the vehicle automatic transmission electrical control system 130, controller switch 133 for a conductor or component faulted to chassis ground negative battery potential 119 as indicated by ammeter reading and no illumination of LED 44.

Electron flow illuminates LEDS 42, 44 verifies positive battery potential at push to open switch 28 to vehicle automatic transmission electrical control system 130 controller switch 133 negative battery potential 119. Upon operation of controller switch 133, LED 44 extinguishes and ammeter reads quantity of electron flow for analysis information. Upon operation of push to open switch 28, LED 44 illuminates and ammeter reading reduces to pre controllers switch 133 operation. This simulation tests specific vehicle automatic transmission electrical control solenoid winding electron path controller switch 133 operation for verification by quantity of ammeter reading compared to specified in service manual.

FIG. 23 also shows other power source, negative power sleeve 19, positive power jack 10, SPST switch 11, permits test for fault indication by LED 12 illumination when specific portion of vehicle automatic transmission electrical control system 133 conductor 81 is shorted to chassis ground negative battery potential 119, and or to facilitate vehicle automatic transmission electrical control system, and invention required 12.5 volt direct current electric power for specific tests, simulations, analyzing and possible fault indications of in vehicle or repair bench automatic transmission electrical control system components operation.

Figure 27:
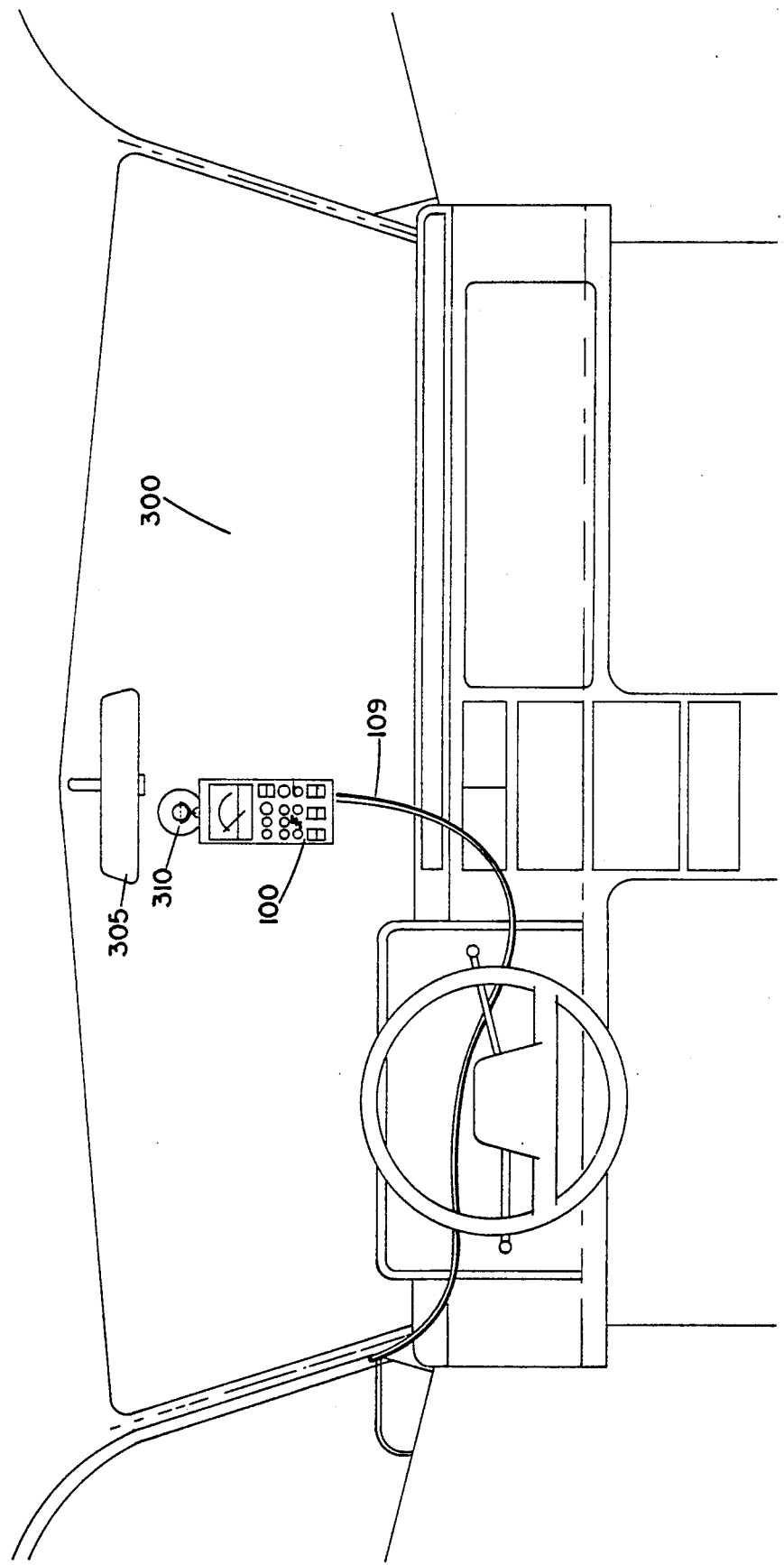
FIG. 27 shows the unit mounted on the inside surface of a vehicle windshield.

The novel unit 100 is illustrated in FIG. 27 mounted on the inside surface of the windshield 300 of a vehicle. Generally this is accomplished with the use of a suction cup 310 having a hook to which the unit 100 is attached by passing the hook through the eyelet 103 of the unit. Alternatively, the unit may be supported from the rear view mirror 305 by attaching the suction cup to the mirror.

What is claimed is:

1. An electrical signal monitoring and signal simulation control analyzing and fault indicating system for use with various automotive automatic transmissions through their preexisting electrical cable conductors that carry electric control signals between the automatic transmission and vehicle automatic transmission electrical controller; said system consisting of:
    (a) means for receiving, monitoring and measuring said electric control signals provided to and from said automatic transmission by said automotive automatic transmission electrical controller;
    (b) means for connecting said receiving, monitoring and measuring means in electrical series with said preexisting electrical cable conductors through which the electric control signals are carried to and from the automatic transmission so as to enable said receiving monitoring and measuring means to monitor said control signals passing there through; and
    (c) said means for receiving, monitoring and measuring being less than seven inches high, four inches wide and three inches deep for detachable mount inside autombile rear view mirror or windshield for minimum visual impairment to vehicle driver visibility providing maximum saftey during road tests.

2. The apparatus as claimed in claim 1, wherein said connecting means include means for mating with preexisting cable conductors connectors in said preexisting cable conductors at their connectors.

3. A portable automatic transmission analyzing and fault indicating system for a vehicle having A) an automatic transmission having a multiple lead electrical connection socket M with a lead A that passes through its torque converter clutch solenoid, B) a conventional driver control unit having a lead A that connects in series a battery, a brake switch, a fuse and the ignition switch; the driver control unit having an electrical connection socket T including lead A; the system comprising:
    a transmission Y-connector cable having electrical connection sockets N, O, and S; said connector cable having lead lines A, B, C, D and E; connection socket N is a terminal for lead lines A, B, C, D, and E; connection socket S is a terminal for lead lines A, B, C, D and E; connection socket O is a terminal for eight lead lines, two of these lines are for lead A and two of these lines are for lead D;
    an elongated connection cable having lead lines A (input), I, D, (input), D (output), H, G, F, and A (output); a connection socket P is on one end and it is detachably connected to socket O, a connection socket Q is on the other end of the cable;
    a testing and analyzing unit in a casing having a connection socket R that is detachably connected to socket Q, a lead A (input) is in series with an ammeter that is also connected to lead A (output); said socket R having lead lines A (input), F, G, H, D (input), D (output), I and A (output); a first electrical circuit in the testing and analyzing unit that is in series with lead A having means for visually indicating if the vehicle's battery has A) deficient voltage, B) a workable amount of voltage, or C) and an excess amount of voltage.

4. A portable automatic transmission analyzing and fault indicating system as recited in claim 3 further comprising:
a second electrical circuit in the testing and analyzing unit that is in series with lead A having means for connecting an outside source of power other than the vehicle's battery to said unit.

5. A portable automatic transmission analyzing and fault indicating system as recited in claim 3 further comprising: means in the testing and analyzing unit having visual indicators that can monitor lead lines B, C, and E of said transmission Y-connector when the vehicle's transmission has second, third or fourth clutch switches.

* * * * *